United States Patent
Witte et al.

(10) Patent No.: US 9,919,480 B2
(45) Date of Patent: Mar. 20, 2018

(54) METHOD AND DEVICE FOR PRODUCING A TEXTILE PREFORM

(71) Applicant: Airbus Operations GmbH, Hamburg (DE)

(72) Inventors: Tassilo Witte, Stade (DE); Alexander Gillessen, Stade (DE); Jan Huelnhagen, Aachen (DE)

(73) Assignee: Airbus Operations GmbH, Hamburg (DE)

( * ) Notice: Subject to any disclaimer, the term of this patent is extended or adjusted under 35 U.S.C. 154(b) by 612 days.

(21) Appl. No.: 14/511,454

(22) Filed: Oct. 10, 2014

(65) Prior Publication Data

US 2015/0130109 A1    May 14, 2015

Related U.S. Application Data

(63) Continuation of application No. PCT/EP2013/056697, filed on Mar. 28, 2013.
    (Continued)

(30) Foreign Application Priority Data

Apr. 12, 2012 (DE) ........................ 10 2012 206 020

(51) Int. Cl.
    *B29C 70/02*    (2006.01)
    *B29C 53/02*    (2006.01)
    (Continued)

(52) U.S. Cl.
    CPC .............. *B29C 70/02* (2013.01); *B29B 11/16* (2013.01); *B29C 53/02* (2013.01); *B29C 53/04* (2013.01);
    (Continued)

(58) Field of Classification Search
    CPC ......... B29C 70/02; B29C 53/02; B29C 53/04; B29B 11/16; B29L 2031/3076; B32B 2605/18
    (Continued)

(56) References Cited

U.S. PATENT DOCUMENTS

| | | |
|---|---|---|
| 7,546,864 B2 | 6/2009 | Kaye |
| 7,967,932 B2 | 6/2011 | Umeda et al. |

(Continued)

FOREIGN PATENT DOCUMENTS

| | | |
|---|---|---|
| DE | 601 19 345 | 8/2006 |
| DE | 10 2008 057782 | 5/2010 |

(Continued)

OTHER PUBLICATIONS

German Search Report for Application No. 10 2012 206 020.0 dated Nov. 19, 2012.

(Continued)

*Primary Examiner* — Nahida Sultana
(74) *Attorney, Agent, or Firm* — Jenkins, Wilson, Taylor & Hunt, P.A.

(57) ABSTRACT

A method for producing a textile preform includes manufacturing a multi-layer fiber fabric, which includes a first flange portion and a web portion connected to the first flange portion, deforming a first fiber layer of the first flange portion with respect to the web portion, such that the first fiber layer is at a first flange portion angle to the web portion, a web height of the web portion being set in a variable manner during the deformation of the first fiber layer, and depositing a unidirectional fiber fabric only on the deformed first fiber layer of the first flange portion.

11 Claims, 9 Drawing Sheets

Related U.S. Application Data

(60) Provisional application No. 61/623,102, filed on Apr. 12, 2012, provisional application No. 61/752,477, filed on Jan. 15, 2013.

(51) Int. Cl.
    *B29B 11/16* (2006.01)
    *B29L 31/30* (2006.01)
    *B29C 53/04* (2006.01)

(52) U.S. Cl.
    CPC ... *B29L 2031/3076* (2013.01); *B32B 2605/18* (2013.01)

(58) Field of Classification Search
    USPC ............ 264/236, 258; 425/289, 302.1, 305.1
    See application file for complete search history.

(56) References Cited

U.S. PATENT DOCUMENTS

| | | | |
|---|---|---|---|
| 8,678,809 B2 | 3/2014 | Suzuki et al. | |
| 9,375,882 B2* | 6/2016 | Beresinski | B29C 70/222 |
| 2007/0022707 A1* | 2/2007 | Gregg | B29C 65/56 |
| | | | 52/837 |
| 2007/0175572 A1* | 8/2007 | Rubin | B29C 70/525 |
| | | | 156/196 |
| 2011/0168324 A1* | 7/2011 | Ender | B29C 33/301 |
| | | | 156/243 |
| 2011/0285055 A1 | 11/2011 | Reinhold et al. | |
| 2013/0209746 A1* | 8/2013 | Reighley | B29D 99/0014 |
| | | | 428/172 |
| 2013/0216770 A1* | 8/2013 | Gilbertson | B29B 11/16 |
| | | | 428/121 |
| 2015/0118345 A1* | 4/2015 | Cruzado Parla | B29C 70/543 |
| | | | 425/395 |

FOREIGN PATENT DOCUMENTS

| | | |
|---|---|---|
| DE | 10 2010 014704 A1 | 10/2011 |
| EP | 1 918 089 | 5/2008 |
| EP | 1 995 040 | 11/2008 |
| WO | WO 02/042 044 | 5/2002 |
| WO | WO 2011/067146 | 6/2011 |
| WO | WO 2013/152961 | 10/2013 |

OTHER PUBLICATIONS

International Search Report for Application No. PCT/EP2013/056697 dated Sep. 26, 2013.

* cited by examiner

METHOD AND DEVICE FOR PRODUCING A TEXTILE PREFORM

CROSS-REFERENCE TO RELATED APPLICATIONS

This application is a continuation of and claims priority to PCT/EP2013/056697 filed Mar. 28, 2013 which claims the benefit of and priority to U.S. Provisional Application No. 61/623,102, filed Apr. 12, 2012, German Patent Application No. 10 2012 206 020.0 filed Apr. 12, 2012, and U.S. Provisional Application No. 61/752,477, filed Jan. 15, 2013, the entire disclosures of which are incorporated by reference herein.

TECHNICAL FIELD

The present disclosure relates to a method for manufacturing a textile preform and to a device for producing a textile preform.

Although applicable to any aircraft or spacecraft, the present disclosure is described in greater detail in relation to an aircraft by way of example.

BACKGROUND

In the manufacture of fiber composite components, in aircraft construction, what are known as prepreg materials are often used. For example, fiber fabrics pre-impregnated with a matrix material are referred to as prepreg material. However, prepreg material of this type has some drawbacks in relation to the production thereof, such as high costs, limited storage life, and high cycle time during processing. An advantageous alternative is for example what is known as resin transfer moulding (RTM). In this context, a dry, that is to say matrix-free, fiber preform is impregnated with matrix material in a mould. A preform of this type is for example of a shape close to the final contour, and is kept in shape for example by means of stitches and/or by means of a thermoplastic binder.

A method and a device for producing preforms of this type is disclosed for example in DE 10 2010 014 704 A1. In this context, in a first step continuously introduced fiber layers are deformed transversely in a predetermined manner, and in a second step the resulting profile is selectively longitudinally curved. However, this system can only produce preforms which are of the same profile over the entire length thereof. This system is further inflexible because layers having a 0° fiber orientation, which are provided in the layer construction, are also deformed; since they cannot be compressed or stretched in the longitudinal direction, they always have to be positioned in the neutral fiber. In particular in aircraft construction, components such as formers are required which are of a variable profile, that is to say in particular a variable height, over the length or the periphery thereof. The requirement for a reduced profile height occurs for reasons of space, for example in the region of a floor structure installed in a fuselage cell.

SUMMARY

One idea of the present disclosure is therefore to provide a textile preform which is of a variable profile over the length thereof.

Accordingly, a method for producing a textile preform is provided, comprising manufacturing a multi-layer fiber fabric, which comprises a first flange portion and a web portion connected to the first flange portion, deforming a first fiber layer of the first flange portion with respect to the web portion, in such a way that the first fiber layer is at a first flange portion angle to the web portion, a web height of the web portion being set in a variable manner during the deformation of the first fiber layer, and depositing a unidirectional fiber fabric only on the deformed first fiber layer of the first flange portion.

Accordingly, a device for producing a textile preform is further provided, comprising: a support for having a multi-layer fiber fabric deposited thereon which comprises a first flange portion and a web portion connected to the first flange portion; an adjustable guiding device for deforming a first fiber layer of the first flange portion with respect to the web portion in such a way that the first fiber layer is at a first flange portion angle to the web portion, it being possible to set a web height of the web portion in a variable manner during the deformation of the first fiber layer; and a deposition device for depositing a unidirectional fiber fabric only on the deformed first fiber layer of the first flange portion.

The idea behind the present disclosure is to deform the fiber layers of the fiber fabric individually, it being possible as a result to set the web height as desired and to vary it during the deformation of the fiber layer. The unidirectional fiber layer, which cannot be deformed in any desired manner, is in each case only deposited after the deformation of the fiber layer. As a result, it is possible to produce a preform which has a variable web height over the periphery and can thus be used very flexibly. Thus, instead of deforming the entire fiber fabric from the start, only some of the fiber layers are deformed, and subsequently are preferably fixed, and the unidirectional fiber fabric is adjoined later on.

Advantageous embodiments may be found in the dependent claims.

In accordance with an embodiment of the method, after the deposition of the unidirectional fiber fabric, a second fiber layer of the first flange portion is deformed with respect to the web portion, in such a way that the second fiber layer is at the first flange portion angle to the web portion, the second fiber layer being positioned on the unidirectional fiber fabric after the deformation. In particular, any desired number of fiber layers of the first flange portion is deformed in such a way that the fiber layers are at the first flange portion angle to the web portion, and after each deformed fiber layer, a unidirectional fiber fabric is deposited only on the correspondingly deformed fiber layer of the first flange portion. As a result, it is possible to deform fiber fabrics comprising any desired number of fiber layers. This makes flexible use of the method possible.

In accordance with a further embodiment of the method, the unidirectional fiber fabric and the deformed fiber layer are fixed by a thermoplastic binder after or during the deposition of the unidirectional fiber fabric on the deformed first fiber layer of the first flange portion. As a result, the manageability of the produced preform is improved.

In accordance with a further embodiment of the method, during the manufacture of the multi-layer fiber fabric, a second flange portion is provided, the web portion being arranged between the first flange portion and the second flange portion and interconnecting the flange portions. Preferably, during the manufacture of the fiber fabric, fiber layers of the second flange portion are deformed with respect to the web portion in such a way that the second flange portion is at a second flange portion angle to the web portion and is of a predetermined second flange height. As a result, it is advantageously possible to produce a Z-shaped or U-shaped preform depending on the field of application.

In accordance with a further embodiment of the method, during the manufacture of the multi-layer fiber fabric, the fiber layers of the second flange portion and the web portion are fixed at least in portions by a thermoplastic binder. As a result, the manageability of the produced preform is improved.

In accordance with a further embodiment of the method, the first flange portion is trimmed to a predetermined second flange height. As a result, a predetermined flange height of the second flange portion is ensured over the entire length of the preform.

In accordance with a further embodiment of the method, the multi-layer fiber fabric is curved with a fiber fabric radius of curvature during the manufacture thereof. This makes it possible to produce a curved preform, and as a result it can advantageously be made use of in curved structures, in particular in fuselage cells.

In accordance with a further embodiment of the method, the fiber fabric is deposited on a support before the deformation of the first fiber layer of the first flange portion. As a result, the processability of the fiber fabric is improved.

In accordance with a further embodiment of the method, the fiber layers of the first flange portion are deformed by a guiding device, the web height of the web portion being set in a variable manner in that the guiding device is displaced towards or away from the support in a transverse direction thereof. This makes it possible to set the web height in a particularly flexible manner and to automate the method.

In accordance with an embodiment of the device, the guiding device is displaceable in a longitudinal direction of the support. In particular, the guiding device can be displaced in a transverse direction of the support, it being possible to set the web height of the web portion in a variable manner in that the guide can be displaced towards or away from the support in the transverse direction. As a result, it is possible to set the web height of the web portion in a flexible manner during the deformation.

In accordance with another embodiment of the device, the support is curved with a fiber fabric radius of curvature. This makes it possible to produce a curved preform, and as a result it can advantageously be made use of in curved structures, in particular in fuselage cells.

BRIEF DESCRIPTION OF THE DRAWINGS

In the following, the disclosure is described in greater detail by way of embodiments, with references to the appended schematic drawings.

In the schematic drawings.

In the drawings, like reference numerals denote like or functionally equivalent components, unless stated otherwise.

DETAILED DESCRIPTION

Figure 1:
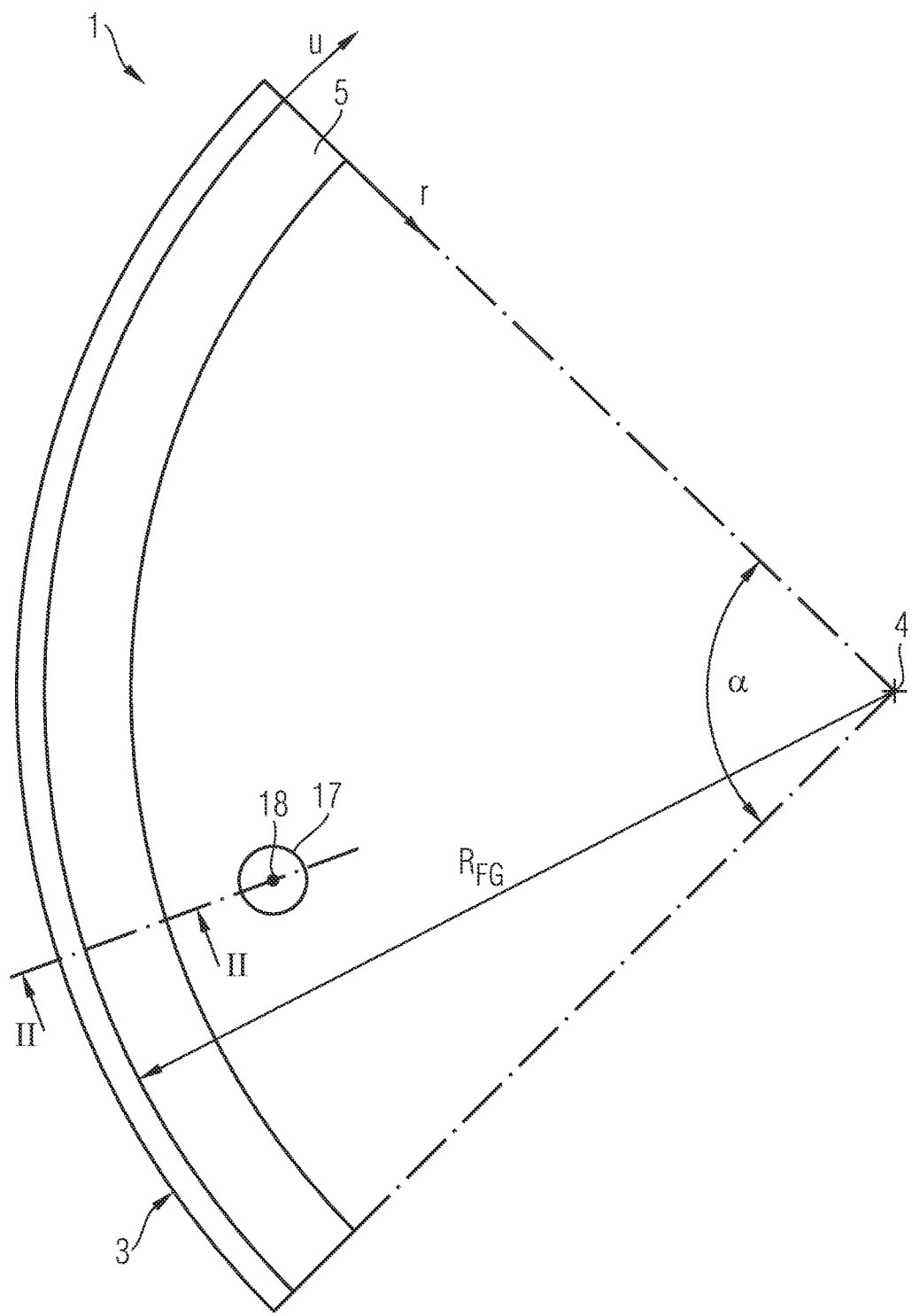
FIG. 1 is a plan view of an embodiment of a device for producing a textile preform.
Figure 2:
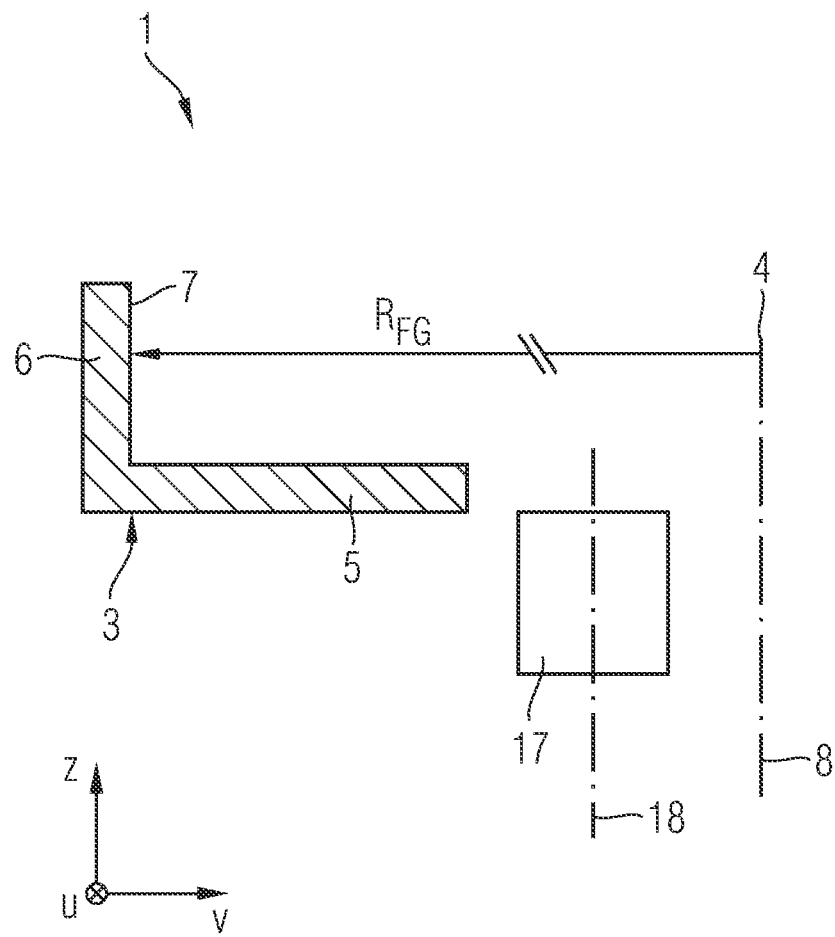
FIG. 2 is a sectional view of the embodiment of the device along the section line II-II of FIG. 1.

FIGS. 1 and 2 are a plan view and a sectional view respectively of an embodiment of a device 1 for producing a textile preform 2. The preform 2 may not need to comprise any matrix material. The preform 2 may however comprise a thermoplastic binder, in particular a pulverulent thermoplastic binder, which can be melted on by introducing heat energy. The preform 2 may have a predetermined cross-sectional profile, which may for example be L-shaped, Z-shaped or U-shaped. The preform 2 may be in the form of what is known as a dry preform 2, and can be infiltrated with a matrix material, for example by what is known as a resin infusion method, in particular by what is known as a resin transfer moulding (RTM) method. For example, a curable thermosetting material and/or a thermoplastic material may be used as the matrix material. After the preform 2 has been infiltrated with the matrix material and the material has cured, the preform forms a fiber composite component which can be processed further, for example a stringer or a stringer portion of a fuselage cell of an aircraft or spacecraft. The textile preform 2 may be used in the field of aviation and aerospace.

The device 1 for producing the textile preform 2 may comprise a support 3, which is for example in the form of a support plate 3. The support 3 may be linear or curved in form. For example, the support 3 is curved with a fiber fabric radius of curvature $R_{FG}$. The fiber fabric radius of curvature $R_{FG}$ has a centre of curvature 4. In particular, the support 3 has an angle of curvature a of for example approximately 60° or 90°. In this context, "approximately" means that the angle of curvature a is either 60±10° or 90±10°, in particular ±5°. Alternatively, the angle of curvature a may be of any desired size. The sometimes arc-shaped support 3 may comprise an arc-shaped deposition surface 5 and a rear wall 6. The rear wall 6 may be of a cylindrical shell shape. The rear wall 6 may be formed integrally with the deposition surface 5. In the cross-section of FIG. 2, the support 3 may have an L-shaped cross-section. The fiber fabric radius of curvature $R_{FG}$ is measured from the centre of curvature 4 to a cylindrical inner face 7 of the rear wall 6. The support 3 has a longitudinal or peripheral direction u, a transverse or radial direction r and a vertical direction z. The peripheral direction u may extend on the arc determined by the fiber fabric radius of curvature $R_{FG}$, the radial direction r may be parallel thereto, and the vertical direction z may be arranged parallel to a central axis 8 of the cylindrical rear wall 6. The central axis 8 extends in particular through the centre of curvature 4. The edges of the support 3, in particular at the contact point of the deposition surface 5 and the rear wall 6, may be rounded. Alternatively, the support 3 may be formed as a linear support 3, that is to say without any curvature. For example, the support 3 is mounted stationary.

Figure 3:
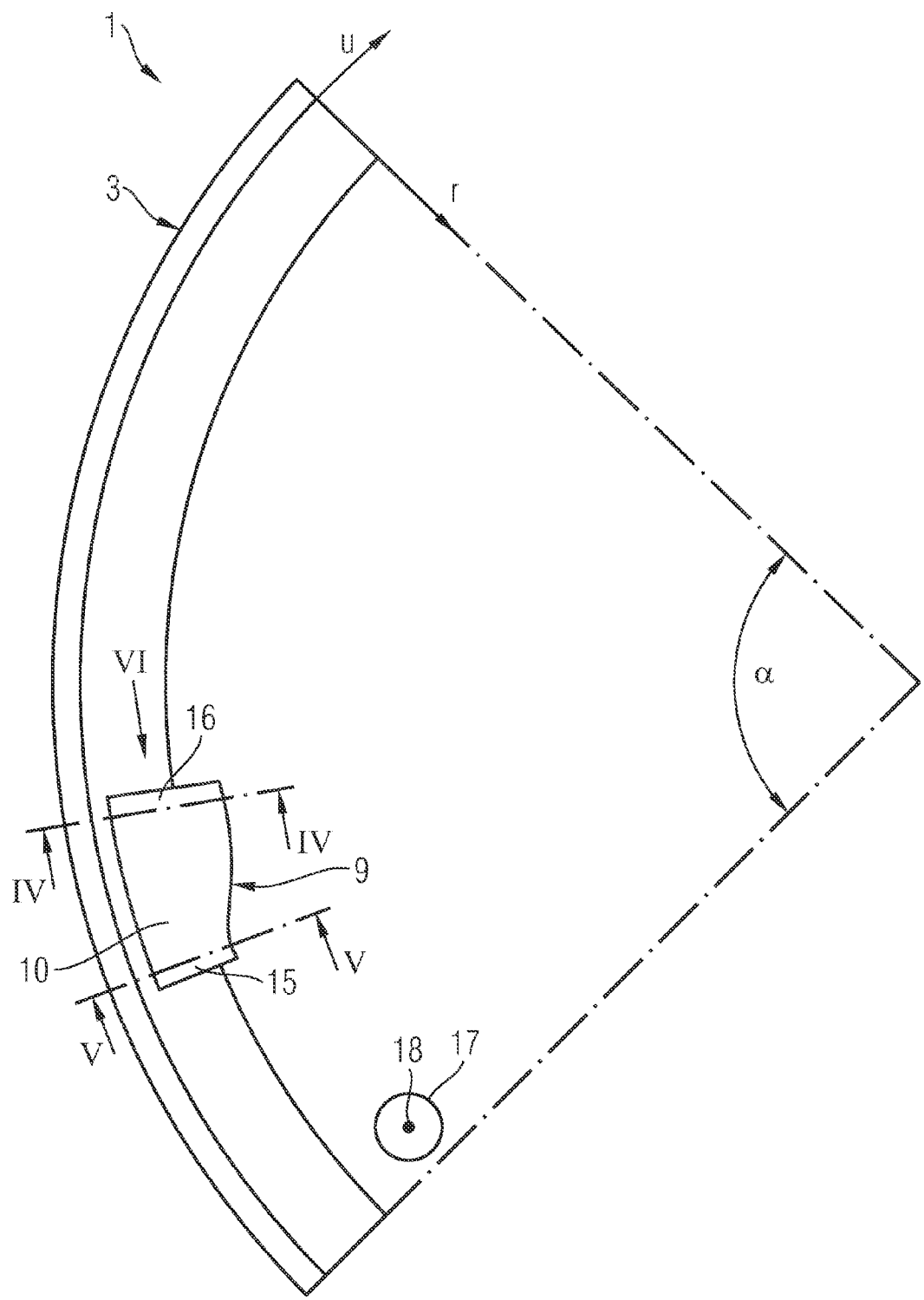
FIG. 3 is a further plan view of the embodiment of the device according to FIG. 1.

The device 1 further comprises, as shown in FIG. 3, an adjustable guide 9. By a drive (not shown), the guide 9 can be displaced towards or away from the support in the radial direction r of the support 3. By this drive, or by a further drive, the guide 9 can additionally be displaced as desired along the peripheral direction u of the support 3. The displacement of the guide in the radial direction r and in the peripheral direction u may take place simultaneously or in succession. The drive is/are formed appropriately for this purpose. The guide 9 can be guided along the support 3 by a guide. The guide may be an integral part of the drive. The guide 9 may be fixed in the z-direction. The guide 9 can thus be displaced in the peripheral direction u of the support 3, and simultaneously be moved continuously towards or away from the support 3 in the radial direction r of the support 3.

Figure 4:
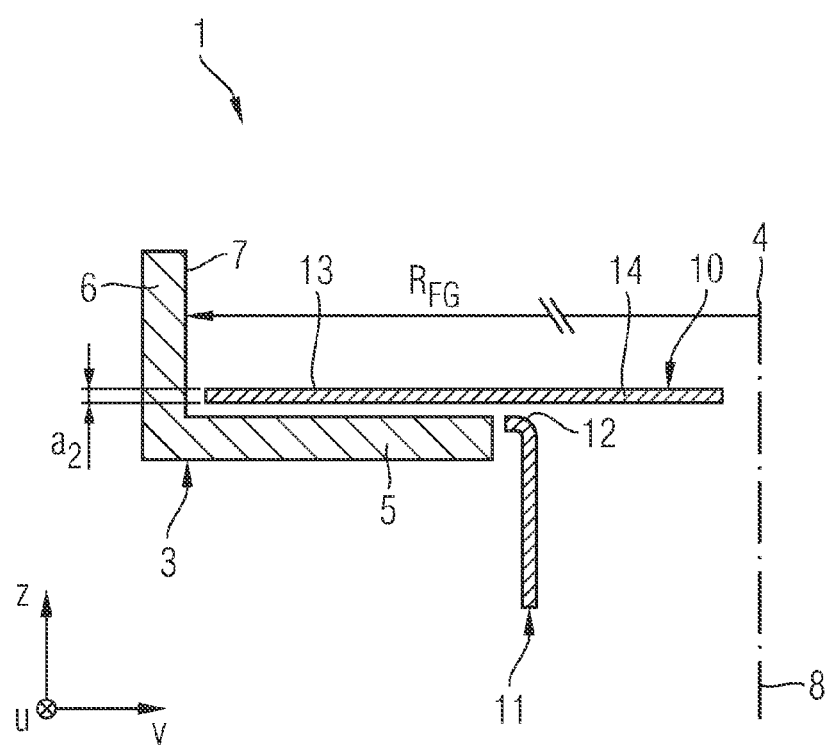
FIG. 4 is a sectional view of the embodiment of the device along the section line IV-IV in FIG. 3.
Figure 5:
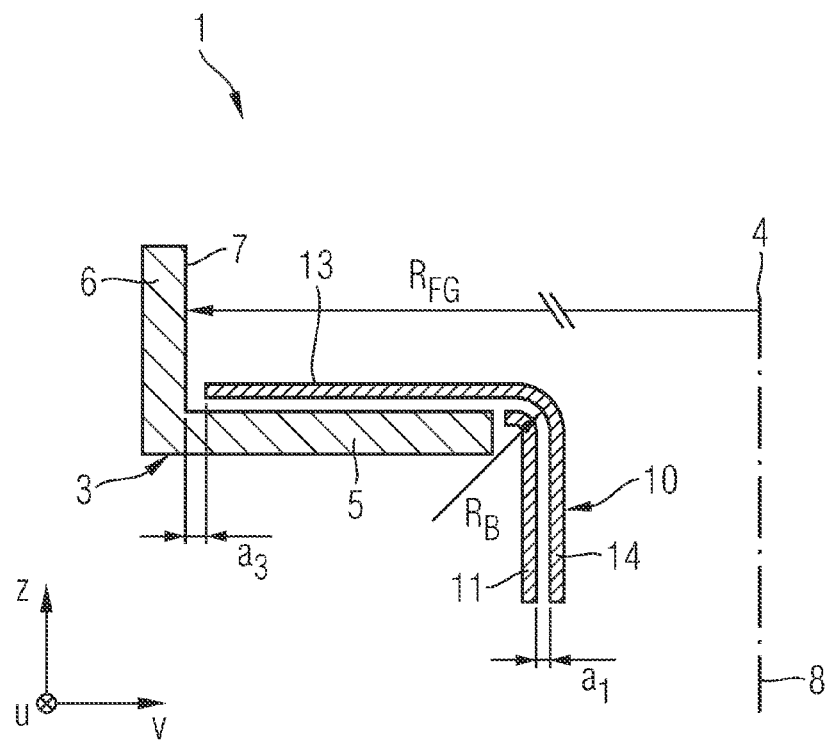
FIG. 5 is a sectional view of the embodiment of the device along the section line V-V in FIG. 3.

As shown in FIGS. 3-5, the guide 9 (see, FIG. 3) comprises at least one guide plate 10, in particular an outer or first guide plate 10, and in one embodiment of the device 1 an optional further, in particular second or inner, guide plate 11. The guide plates 10, 11 may be spaced apart in the radial direction r by an, in particular first, distance a1. The second guide plate 11 is of an approximately rectangular cross-section. The guide plate 11 may follow the curvature of the support 3. The guide plate 11 is in particular in the form of a portion of a hollow cylinder having the central axis 8. At an end portion 12 of the guide plate 11, facing the support 3, the guide plate 11 may have a rounding, the radius of which is matched to a bending radius RB of the first guide plate 10.

The first guide plate 10 may comprise a support portion 13 which has a curvature corresponding to the support 3. The support portion 13 may be arranged with respect to the support 3 so as to be spaced apart from the deposition surface 5 by an, in particular second, distance $a_2$ and from the inner face 7 of the rear wall 6 by an, in particular third, distance $a_3$. The distances $a_2$ and $a_3$ may be continuously adjustable depending on the thickness of the material to be processed or of the preform 2 to be produced. The guide plate 10 further comprises a deformation portion 14. The deformation portion 14 is arranged approximately parallel to and spaced apart from the deposition surface 5, at least in portions, and approximately parallel to and spaced apart from the second guide plate 11, that is to say approximately parallel to the rear wall 6, at least in portions.

Figure 6:
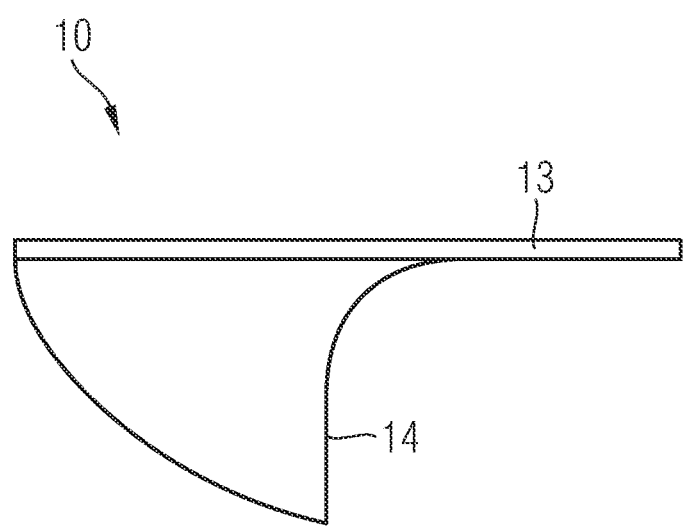
FIG. 6 is a view of a guide plate of the embodiment of the direction in the view VI of FIG. 3.

At a first end portion 15 (see plan view, FIG. 3) of the guide plate 10, the support portion 13 and the deformation portion 14 according to FIG. 5 form an L-shape, substantially in the cross-section of the guide plate 10. Proceeding from the first end portion 15 having the L-shape to the second end portion 16 (see, FIG. 3), the deformation portion 14 warps continuously, in such a way that the support portion 13 and the deformation portion 14 at the second end portion 16 of the guide plate 10 approximately form a rectangular cross-section according to FIG. 4. FIG. 6 is a front view, in accordance with the view VI of FIG. 3, merely of the guide plate 10, to illustrate the deformation or twisting of the guide plate 10 as described above. For example, the guide plates 10, 11 are rigidly interconnected to form the guide 9. However, the guide plate 11 is optional and is not absolutely necessary. The device 1 may comprise a plurality of guide 9.

The device 1 may further comprise a deposition mechanism 17, which is suitable for depositing a fiber fabric. The device 1 further comprises a press-on and/or fixing mechanism, which can be integrated into the deposition device 17. The deposition device 17 may be in the form of a deposition roller 17 having a central axis 18. The central axis 18 is preferably arranged parallel to the central axis 8. The deposition device 17 may preferably be displaceable in the u, r and z directions. This can be done simultaneously or in succession. A drive may be provided for this purpose.

Figure 7:
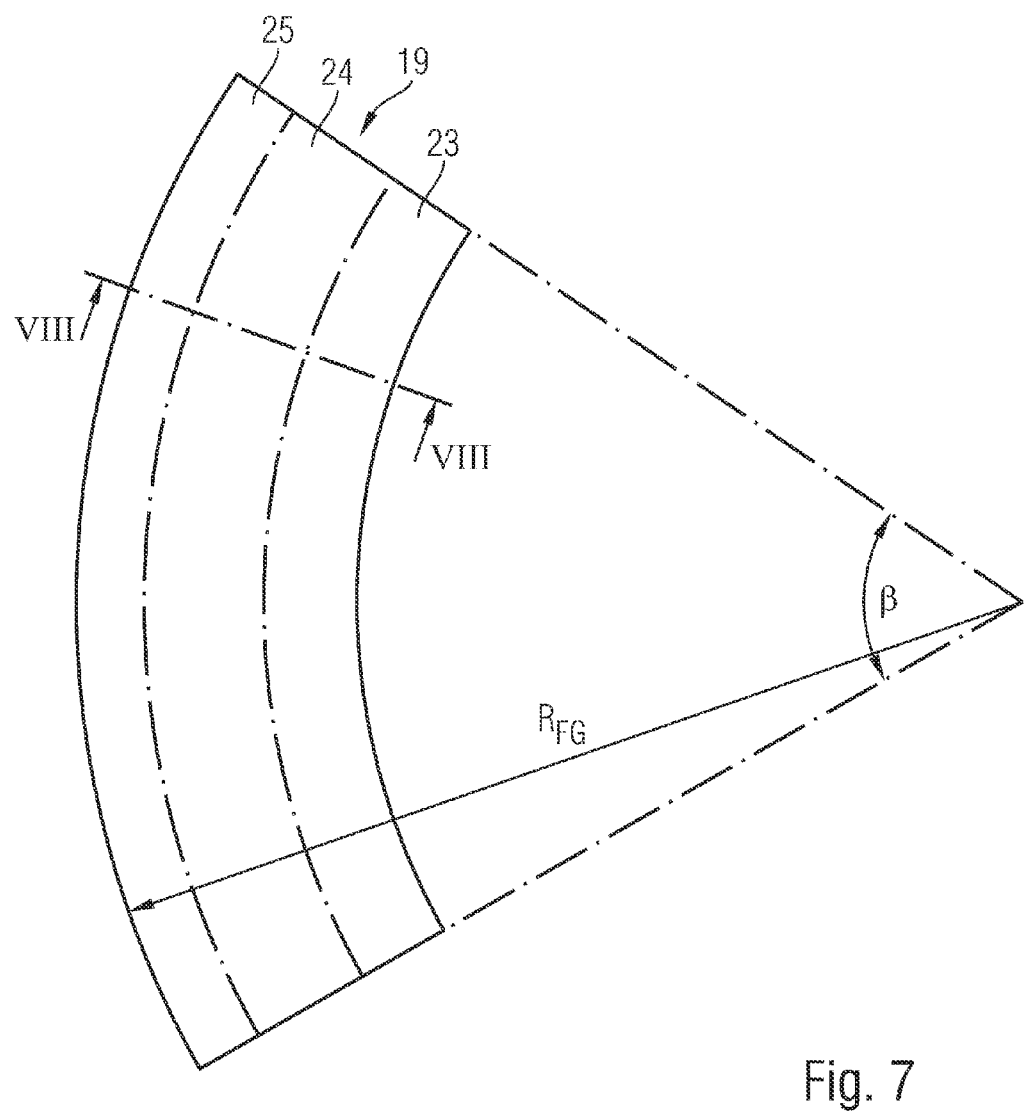
FIG. 7 is a plan view of a multi-layer fiber fabric.
Figure 8:
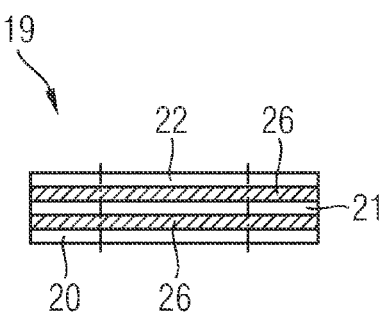
FIG. 8 is a sectional view of the multi-layer fiber fabric along the section line VIII-VIII of FIG. 7.

The operation of the device 1 and a method for producing a textile preform 2 are described in the following. Initially, a multi-layer fiber fabric 19 is provided or manufactured. FIGS. 7 and 8 show an example embodiment of a fiber fabric 19 of this type, FIG. 8 being a sectional view of FIG. 7. The fiber fabric 19 may comprise a plurality of fiber layers 20, 21, 22. There may be any desired number of fiber layers 20, 21, 22. Each of the fiber layers 20, 21, 22 comprises fibers which are arranged in a defined fiber direction in each case. The fiber layers 20, 21, 22 may be sewn together. The fiber fabric 19 may be in the form of what is known as a non-crimp fabric cluster (NCF cluster). The fiber fabric 19 may for example be of a square or alternatively a curved shape. In the following, a fiber fabric 19 of a curved shape is discussed. The fiber fabric has the fiber fabric radius of curvature RFG and an angle of curvature β. The angle of curvature β may correspond to the angle of curvature a of the support 3. The individual fiber layers 20, 21, 22 extend, in particular over the whole area, over an entire surface area of the fiber fabric 19. The fiber fabric 19 may comprise a first flange portion 23 and a web portion 24 connected to the first flange portion 23. For example, the multi-layer fiber fabric 19 comprises a second flange portion 25, the web portion 24 being arranged in particular between the first flange portion 23 and the second flange portion 25 and interconnecting the two flange portions 23, 25 (see, e.g., FIG. 7). The fiber layers 20, 21, 22 of the fiber fabric 19 extend, for example over the whole area, over the web portion 24 and the flange portions 23 and 25, that is to say the web portion 24 and the flange portions 23, 25 may be formed integrally. For example, the fiber fabric 19 comprises a pulverulent binder 26, which may be arranged over the whole area between the fiber layers 20, 21, 22 and which may be in the form of a thermoplastic and can be melted on by introducing heat so as to interconnect or fix together the fiber layers 20, 21, 22 at least in portions.

Figure 9:
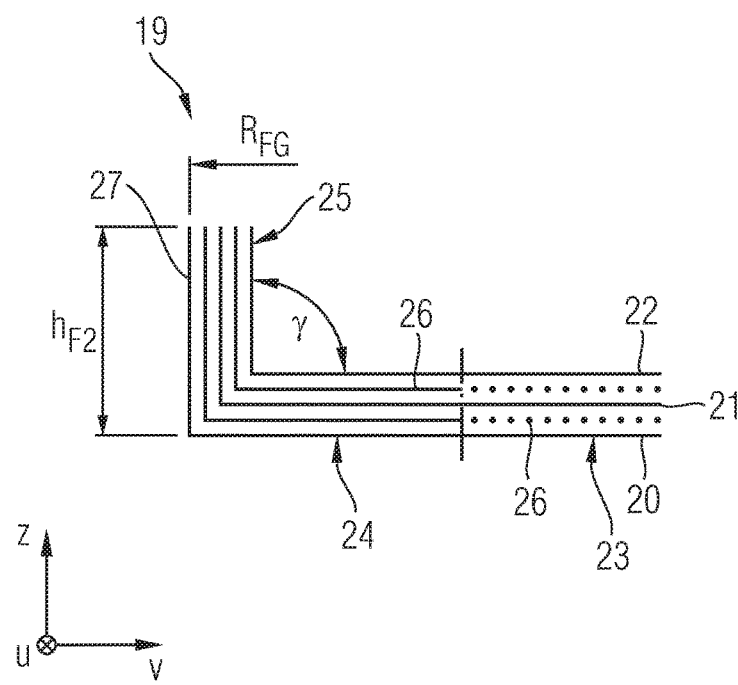
FIG. 9 is a sectional view of a development of the multi-layer fiber fabric according to FIG. 7.

During the manufacture or preparation of the fiber fabric 19, the fiber layers 20, 21, 22 of the second flange portion 25 can be deformed with respect to the web portion 24 in such a way that the second flange portion 25 is at an, in particular second, flange portion angle γ to the web portion. The flange portion angle γ of the second flange portion 25 may be approximately 90°. The flange portion angle γ may be of any desired size. After the deformation, the second flange portion 25 is approximately in the form of a hollow cylinder. FIG. 9 illustrates a fiber fabric comprising a deformed second flange portion 25. The second flange portion 25 is of a predetermined flange height $h_{F2}$, which may be constant over the entire peripheral direction of the fiber fabric 19. For example, the thermoplastic binder 26 is melted on in the region of the second flange portion 25 and at least in portions in the region of the web portion 24, so as to fix together the second flange portion 25 and the web portion 24. In the region of the first flange portion 23, the binder 26 may initially remain in the pulverulent starting state thereof. The multi-layer fiber fabric 19 may be of an L-shaped cross-section, as shown in FIG. 9, the second flange portion 25 for example forming the shorter limb of the L shape. The second flange portion 25 is optional, as explained above, and may therefore be omitted. The multi-layer fiber fabric 19 has a longitudinal or peripheral direction u, a transverse or radial direction r and a vertical direction z, in a manner analogous to the support.

Figure 10A:
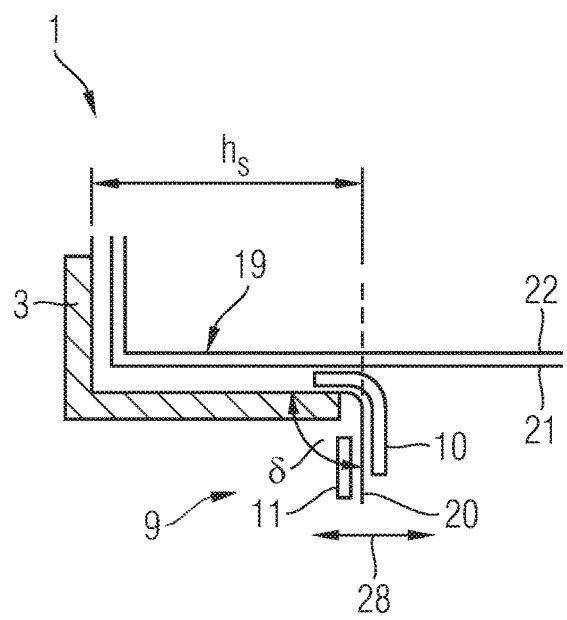
FIG. 10A to 10E illustrate a method for producing a textile preform.

For the method steps described in the following, it is assumed that the fiber fabric 19 comprises a previously deformed second flange portion 25. The method can of course also be carried out with fiber fabrics without a second flange portion deformed in this manner. To produce the textile preform 2, the multi-layer fiber fabric 19, prepared as described above, is deposited on the support 3 of the device 1. In this context, an outer face 27 of the second flange portion 25 of the fiber fabric 19 may be positioned against the cylindrical inner face 7 of the rear wall 6 of the support 3, and the web portion 24 may be positioned at least in portions on the deposition surface 5. By the guide 9, in particular the guide plates 10, 11, which is displaced in the peripheral direction u of the support 3, the first fiber layer 20 of the first flange portion 23 is deformed with respect to the web portion 24, in accordance with FIG. 10A. For this purpose, the guide plate 10 is passed between the first fiber layer 20 and the second fiber layer 21 and displaced along the support 3 in the peripheral direction u, the first fiber layer 20 being arranged between the first guide plate 10 and the second guide plate 11. The distance $a_1$ between the guide plates 10, 11 can be adapted in accordance with a thickness of the fiber layer 20, in such a way that the first fiber layer 20 slides between the guide plates 10, 11 easily, but is still reliably guided. The distances $a_2$ and $a_3$ are likewise adapted in a corresponding manner in accordance with a thickness of the web portion 24 and a thickness of the second flange portion 25. During the displacement of the guide 3 in the peripheral direction u of the support 3, the first fiber layer 20 is initially brought into contact with the second end portion of the first guide plate 10 and deformed by way of the deformation of the first guide plate 10 towards the first end portion 15 thereof.

The first fiber layer 20 may be deformed in such a way that it is at an, in particular first, flange portion angle δ to the web portion 24. The first fiber layer 20 may be deformed counter to the deformation direction of the second flange portion 25. To produce a U-shaped preform, the fiber layer 20 is deformed in the opposite direction. A web height $h_S$ of the web portion 24, in particular of the first fiber layer 20 of the web portion 24, is defined by a distance of the deformed fiber layer 20 from the outer face 27 of the fiber fabric 19 in the radial direction r. During the deformation of the fiber layer 20, the guide 9 can be moved continuously in a radial direction towards and away from the support 3 in the direction of the arrow 28. Thus, the web height $h_S$ can be adjusted as desired during the deformation of the fiber layer 20. As a result, it is possible to achieve a variable web height $h_S$ in the longitudinal or peripheral direction u of the fiber fabric 19.

Figure 10B:
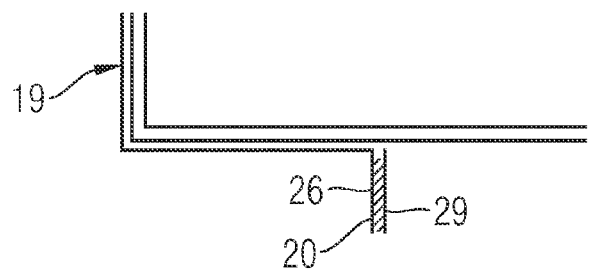

After the deformation of the first fiber fabric 20 of the first flange portion 23, in accordance with FIG. 10B a unidirectional fiber fabric 29 is deposited on the deformed first fiber layer 20 by the deposition mechanism 17. For simplicity, the support 3, the guide 9 and the deposition mechanism 17 are not shown in FIG. 10B to 10E. A unidirectional fiber fabric should be understood to mean a fiber fabric comprising fibers which merely have one fiber orientation. The fibers may be sewn together. The unidirectional fiber fabric 29 may comprise one or a plurality of fiber layers. The unidirectional fiber fabric 29 may also comprise the binder 26. For example, the fibers of the unidirectional fiber fabric 29 are orientated in such a way that they are orientated in the vertical direction z of the fiber fabric 19. For example, after or during the deposition of the unidirectional fiber fabric 29 on the deformed first fiber layer 20 of the first flange portion 23, the thermoplastic binder 26 is melted on and the deformed fiber layer 20 and the unidirectional fiber fabric 29 are fixed together. Since the fiber layers 20, 21, 22 are deformed individually and the fiber fabric 19 is fanned out during the deformation process, the disclosed method is also referred to as fan deformation.

Figure 10C:
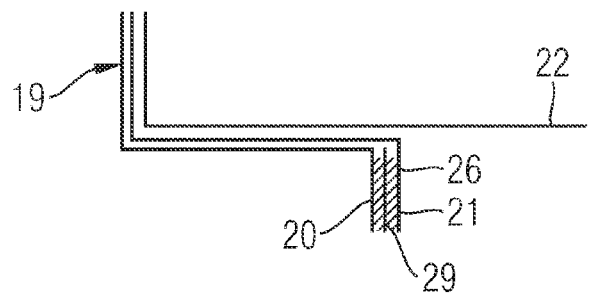
Figure 10D:
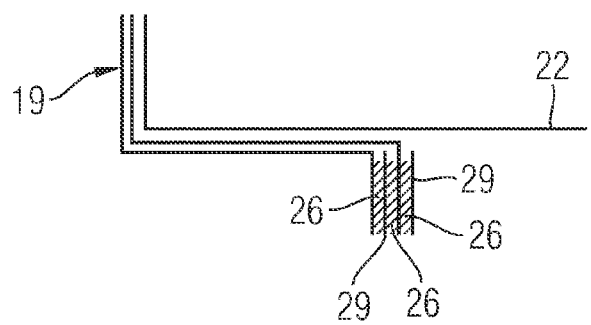
Figure 10E:
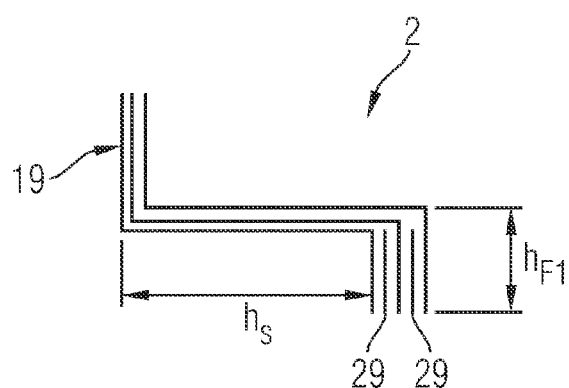

For example, after the deposition of the unidirectional fiber fabric 29, in accordance with FIG. 10C the fiber layer 21 of the first flange portion 20 can be deformed with respect to the web portion 24 by the guide 9 in such a way that the second fiber layer 21 is also at the first flange portion angle δ to the web portion 24. After the deformation, the second fiber layer 21 is preferably positioned on the unidirectional fiber fabric 29. After the deformation of the second fiber layer 21, the unidirectional fiber fabric 29 may be again deposited thereon in accordance with FIG. 10D and fixed by melting on the thermoplastic binder 26. Once the unidirectional fiber fabric 29 has been deposited again, in accordance with FIG. 10E the third fiber layer 22 of the first flange portion 23 may be deformed in such a way that the third fiber layer 22 is at the first flange portion angle δ to the web portion 24. After the deformation, the third fiber layer 22 is positioned on the unidirectional fiber fabric 29 that is located adjacent to the third fiber layer 22. The third fiber layer 22 can also be fixed by melting on the thermoplastic binder 26. FIG. 10E shows the prepared preform 2, which comprises the deformed multi-layer fiber fabric 19 and the unidirectional fiber fabric 29. The preform 2 is thus of a profile or web height $h_S$ which can be varied as desired over the length or peripheral direction thereof. The fiber layers 20, 21, 22 may be deformed by way of a plurality of guide 9, which can be arranged in succession in the peripheral direction u of the support 3. The device 1 may further comprise a plurality of deposition mechanism 17 for depositing the unidirectional fiber fabric.

Figure 11A:
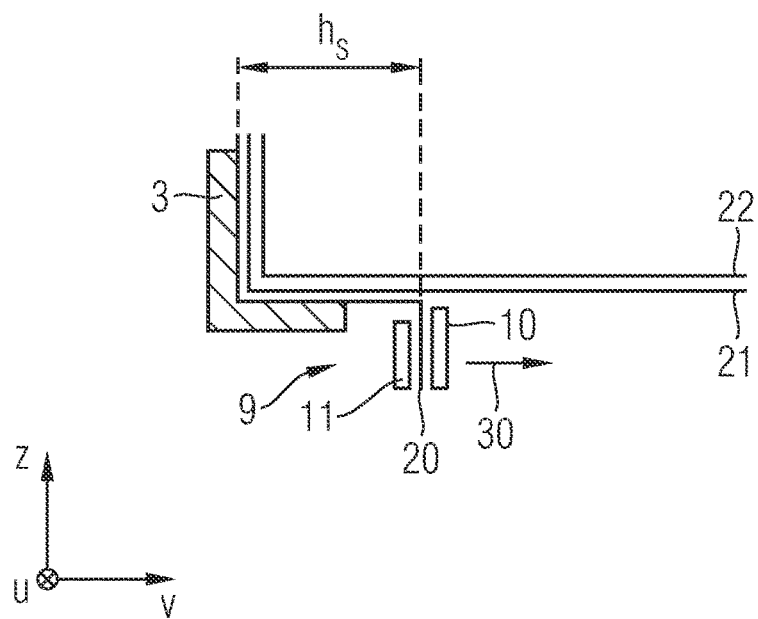
FIGS. 11A and 11B illustrate the method for producing a textile preform.
Figure 11B:
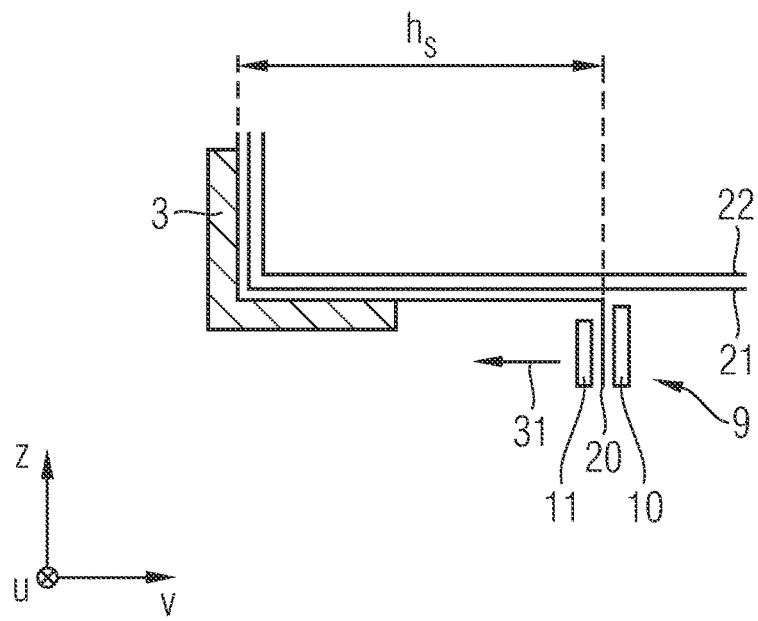

FIGS. 11A and 11B illustrate by way of example how the web height $h_S$ of the web portion 24 can be set in a variable manner. The guide 9 comprising the guide plates 10, 11 may be displaced in the longitudinal or peripheral direction u of the support 3 at a constant or variable speed. In this context, the fiber layer 20 may be guided between the guide plates 10, 11. In accordance with FIG. 11A, by simultaneously displacing the guide 9 in the transverse direction or radial direction r of the support 3, the web height $h_S$ is increased in that the guide 9 is displaced away from the support 3 in the direction r, as indicated by the arrow 30. In accordance with FIG. 11B, by simultaneously displacing the guide 9 in the transverse direction or radial direction r of the support 3, the web height $h_S$ is reduced in that the guide 9 is displaced towards the support 3 in the direction r, as indicated by the arrow 31.

The steps of deforming any desired number of fiber layers of the multi-layer fiber fabric 19 and depositing the unidirectional fiber fabric 29 between the deformed fiber layers can be repeated any desired number of times, until all of the layers of the multi-layer fiber fabric 19 are deformed. It is also possible to deform a plurality of fiber layers of the fiber fabric 19 simultaneously.

Once all of the layers 20, 21, 22 of the multi-layer fiber fabric 19 are deformed and fixed, the first flange portion 23 can be trimmed to a predetermined web height $h_{F1}$ by a cutting mechanism, that is to say cut to size. It is thus possible, by the disclosed device 1 or the method, to produce a curved Z-carrier of a freely variable web height $h_S$. The disclosed device 1 or method can of course also be used for preforms of different cross-sectional geometries, other than the Z-shaped cross-section of the present example.

The stated materials, numbers and dimensions should be understood as exemplary, and are merely used to explain the embodiments and developments of the present disclosure.

Naturally, it is also possible to use the disclosure in other fields, in particular in vehicle manufacturing and shipbuilding.

The invention claimed is:

1. A method for producing a textile preform, comprising:
   manufacturing a multi-layer fiber fabric, which comprises a first flange portion and a web portion connected to the first flange portion;
   deforming a first fiber layer of the first flange portion with respect to the web portion, such that the first fiber layer is at a first flange portion angle to the web portion, a web height of the web portion being set in a variable manner during the deformation of the first fiber layer; and
   depositing a unidirectional fiber fabric only on the deformed first fiber layer of the first flange portion.

2. The method according to claim 1, wherein after the deposition of the unidirectional fiber fabric, a second fiber layer of the first flange portion is deformed with respect to the web portion, such that the second fiber layer is at the first flange portion angle to the web portion, the second fiber layer being positioned on the unidirectional fiber fabric after the deformation.

3. The method according to claim 2, wherein a number of fiber layers of the first flange portion are deformed such that the fiber layers are at the first flange portion angle to the web portion, and in that after each deformed fiber layer, a unidirectional fiber fabric is deposited only on the correspondingly deformed fiber layer of the first flange portion.

4. The method according to claim 1, wherein the unidirectional fiber fabric and the deformed fiber layer are fixed by a thermoplastic binder after or during the deposition of the unidirectional fiber fabric on the deformed first fiber layer of the first flange portion.

5. The method according to claim 1, wherein during the manufacture of the multi-layer fiber fabric, a second flange portion is provided, the web portion being arranged between the first flange portion and the second flange portion and interconnecting the flange portions.

6. The method according to claim 5, wherein during the manufacture of the multi-layer fiber fabric, fiber layers of the second flange portion are deformed with respect to the web portion such that the second flange portion is at a second flange portion angle to the web portion and is of a predetermined second flange height.

7. The method according to claim 6, wherein during the manufacture of the multi-layer fiber fabric, the fiber layers of the second flange portion and the web portion are fixed at least in portions by a thermoplastic binder.

8. The method according to claim 1, wherein the first flange portion is trimmed to a predetermined second flange height.

9. The method according to claim 1, wherein the multi-layer fiber fabric is curved with a fiber fabric radius of curvature during the manufacture thereof.

10. The method according to claim 1, wherein the unidirectional fiber fabric is deposited on a support before the deformation of the first fiber layer of the first flange portion.

11. The method according to claim 10, wherein fiber layers of the first flange portion are deformed by a guiding device, the web height of the web portion being set in a variable manner in that the guiding device is displaced towards or away from the support in a transverse direction thereof.

* * * * *